United States Patent [19]

Howell et al.

[11] Patent Number: 6,069,790
[45] Date of Patent: *May 30, 2000

[54] PORTABLE COMPUTER EJECTION MECHANISM FOR DOCKING DEVICES

[75] Inventors: Bryan Howell; Chris Jaggers, both of Austin; Orin Ozias, Cedar Park, all of Tex.; Peter Skilman, San Carlos; Robert Gregory Twiss, Portola Valley, both of Calif.

[73] Assignee: Dell USA, L.P., Round Rock, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/014,191

[22] Filed: Jan. 27, 1998

[51] Int. Cl.$^7$ .............................. G06F 1/16; H05K 7/12; H01R 13/62
[52] U.S. Cl. ...................... 361/686; 361/726; 439/155; 292/122
[58] Field of Search .................................... 361/686, 685, 361/684, 683, 754, 679, 725, 726, 732, 740, 747, 798, 759, 801; 364/708.1; 292/222, 117, 98, 224, 200, 49; 439/155, 160, 159, 157, 152; 211/26

[56] References Cited

U.S. PATENT DOCUMENTS

| | | | |
|---|---|---|---|
| 3,838,233 | 9/1974 | Bridges | 292/49 |
| 4,461,511 | 7/1984 | Bernekine et al. | 292/49 |
| 4,501,460 | 2/1985 | Sisler . | |
| 4,770,459 | 9/1988 | Nakaiwa et al. | 292/49 |
| 4,975,073 | 12/1990 | Weisman | 439/157 |
| 5,208,735 | 5/1993 | Twachtmann et al. | 211/26 |
| 5,280,778 | 1/1994 | Kotsiopoulos | 292/49 |
| 5,305,180 | 4/1994 | Mitchell et al. | 361/685 |
| 5,310,358 | 5/1994 | Johnson et al. | 439/358 |
| 5,558,527 | 9/1996 | Lin | 439/155 |
| 5,580,182 | 12/1996 | Lin | 403/325 |
| 5,619,398 | 4/1997 | Harrison et al. | 361/686 |
| 5,655,918 | 8/1997 | Soh | 439/159 |
| 5,740,012 | 4/1998 | Choi | 361/686 |
| 5,790,375 | 8/1998 | Lee | 361/686 |
| 5,825,616 | 10/1998 | Howell et al. | 361/684 |

Primary Examiner—Benjamin R. Fuller
Assistant Examiner—Jagdish Patel
Attorney, Agent, or Firm—Haynes & Boone, L.L.P.

[57] ABSTRACT

A docking device includes a latch for secured engagement with a portable notebook computer. A computer release and eject arm is pivotably mounted in the docking device. The arm includes an elongated body having a handle on one end. A single manual movement of the handle causes the arm to move about a pivot mount on the arm. A first cam surface formed on the arm moves the latch to an unlatch position. A second cam surface maintains the latch in position as the arm continues to pivot. An eject finger extending from the arm, engages the notebook computer and urges the computer away from the docking device for separating engagement of the computer connector and the docking device connector.

8 Claims, 5 Drawing Sheets

PORTABLE COMPUTER EJECTION MECHANISM FOR DOCKING DEVICES

BACKGROUND

The disclosures herein relate generally to portable computers and more particularly to a release and eject device used to separate a portable notebook computer from a docking station.

Various latching devices have been developed for securing or docking one device with another. In one application, a latching system has been developed for use with computers. The latching mechanism effects simple positive engagement and disengagement of the pin and socket connectors as respective outer surfaces of a first wall on a first module housing and a second wall on a second module housing are brought together or separated. The second wall carries a plurality of hooking members which pass through corresponding apertures in the first wall and are captured and restrained by a reciprocable latch bar inside the first housing. A rotary latch engages the latch bar such that actuation of a handle on the rotary latch causes reciprocation of the latch bar between a first accommodating position and a second capturing position. The hooking members have respective camming surfaces in spaced facing relationship to the external surface of the second wall while the latch bar is formed with complementarily configured camming surfaces spaced and located so as to engage the camming surfaces on the hooking members when the latch bar moves towards its capturing position. The hooking members are distributed over the surface so that the modules are drawn together in a direction that minimizes sideways forces on the pins in the connector.

Port replicators and docking stations are docking devices which attach to the back of a portable notebook computer via a single docking connector. Docking devices have several other connectors which remain connected to various cables, e.g. printer, power, video, etc. In this manner, a notebook computer can pass standard I/O signals to peripheral devices via the docking device without the need to make all of the cable connections directly to the notebook computer. Thus, the user of the notebook computer can quickly engage and disengage the notebook computer from the docking device.

There are other methods of interconnecting notebook computers with port replicators and docking stations. Some models merely plug in. Others include mechanical assist devices to urge the interconnected plugs apart to overcome the gripping effect of the male-female connection. Still others include interlatching devices for security purposes thus providing both an electrical-mechanical plug connection and a security latching device.

The plug connection requires an uncomfortable amount of pressure to manually release the notebook computer from the docking device. It is possible to damage the connection if disengagement is not properly accomplished. It is also important to provide a disengagement device which can be quickly and easily used in various size docking devices and can accommodate various shaped and sized notebook computers.

Therefore, what is needed is an apparatus and a method for securing a portable notebook computer to a docking device and for quickly releasing the secured notebook computer in a manner which unlatches the security device and overcomes the mating forces between the docking device connector and the computer connector and which manually facilitates the disengagement of the computer from the docking device.

SUMMARY

One embodiment, accordingly, includes an apparatus and a method of securing a portable notebook computer to a docking device and releasing the secured connection between the computer and the docking device and ejecting the computer connector from engagement with the docking device connector in a single, one-handed motion. To this end, a computer release and eject arm comprises an elongated body having a handle on one end. A pivot mount is formed on the body. A first cam surface is also formed on the body and is spaced apart from the pivot mount. A second cam surface is contiguous with and extends angularly relative to the first cam surface.

A principal advantage of this embodiment is that the computer is both unlatched and separated from the docking device in a single, one-handed action. The release and eject arm cams the latch to an unlatch position and maintains the latch in position while the eject mechanism separates the computer connector from the docking device connector. The release and eject arm can be operated in either a push or a pull manual motion and can be used in various size docking devices for various shaped and sized notebook computers.

DETAILED DESCRIPTION OF THE PREFERRED EMBODIMENT

Figure 1:
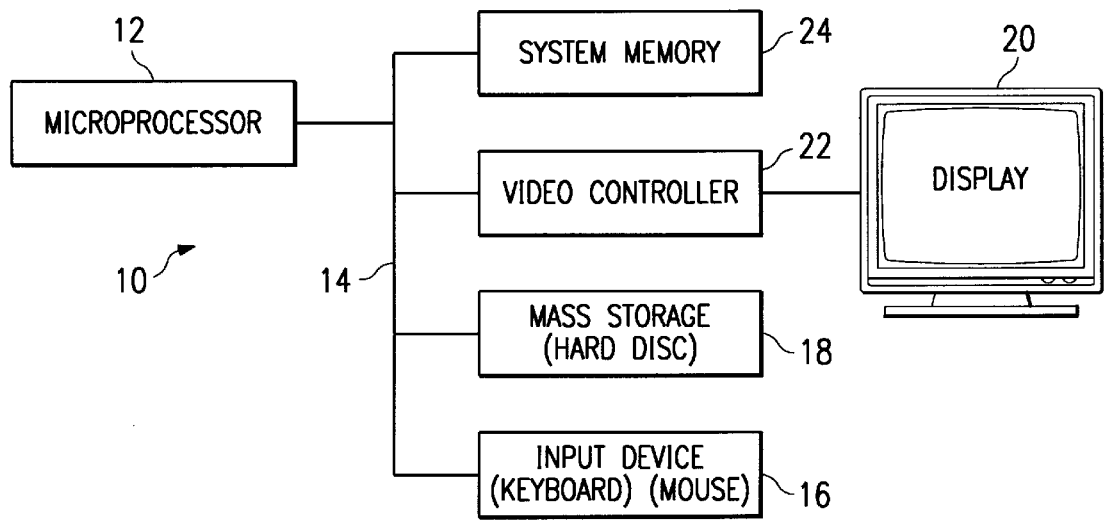
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
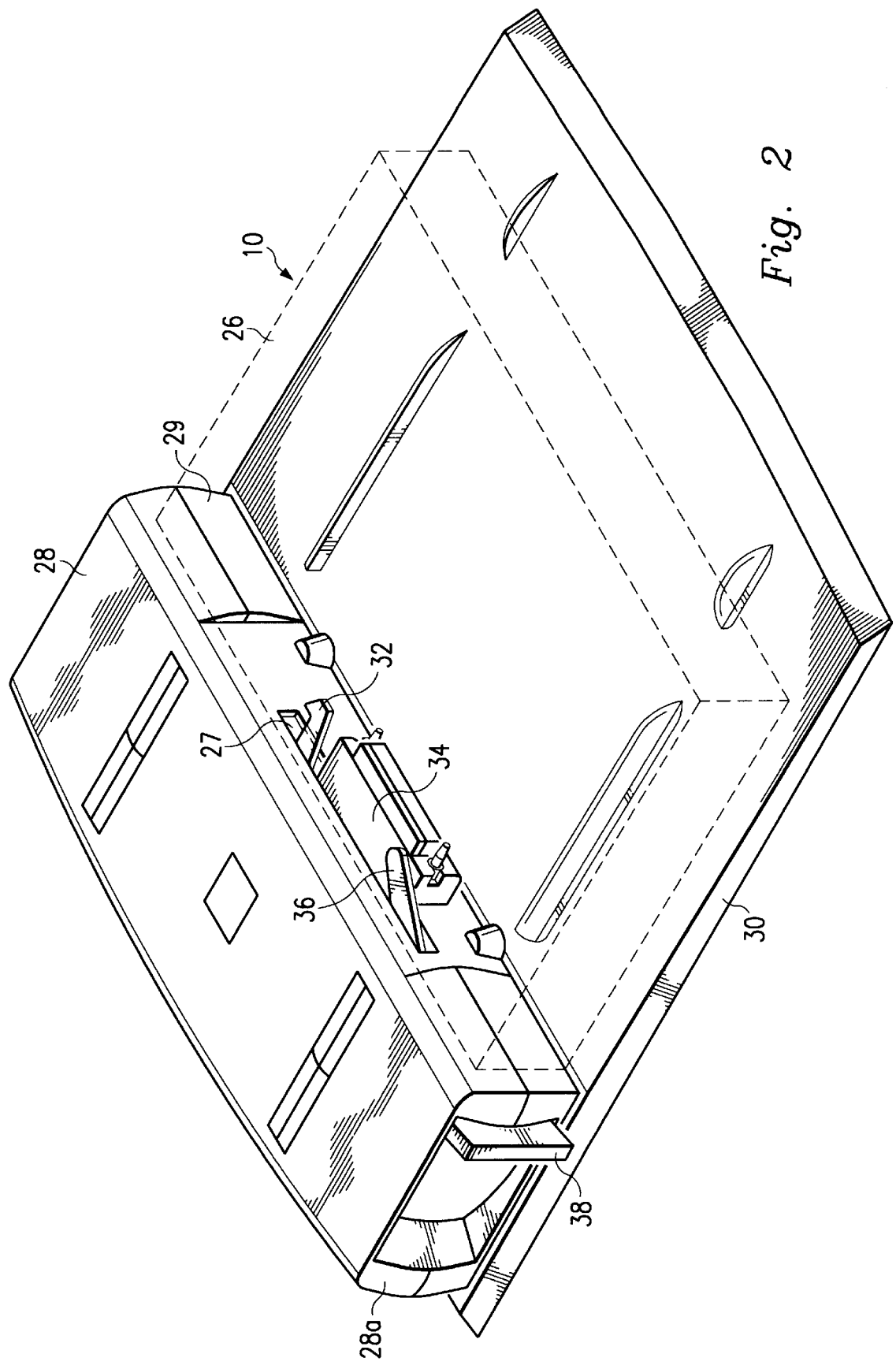
FIG. 2 is an isometric view illustrating an embodiment of a docking station on a docking tray and illustrating a docked portable computer in phantom outline.

Computer system 10, FIG. 2, is housed in a portable notebook computer 26 docked with a docking device 28 on a docking tray 30. Docking device 28 is latched to computer 26, illustrated in phantom outline, by means of a latch 32 which extends from a slot 27 formed in a front surface 29 of docking device 28 and into a receiving slot (not shown) in computer 26. A connector 34 of docking device 28 is engaged with a mating connector (not shown) in the computer 26. An eject finger 36 projects from the slot 27 in docking device 28. The latch 32 and the eject finger 36 are positioned adjacent connector 34. A handle 38 projects from a side surface 28a of docking device 28 and is connected to move eject finger 36 and latch 32 as discussed below.

Figure 3:
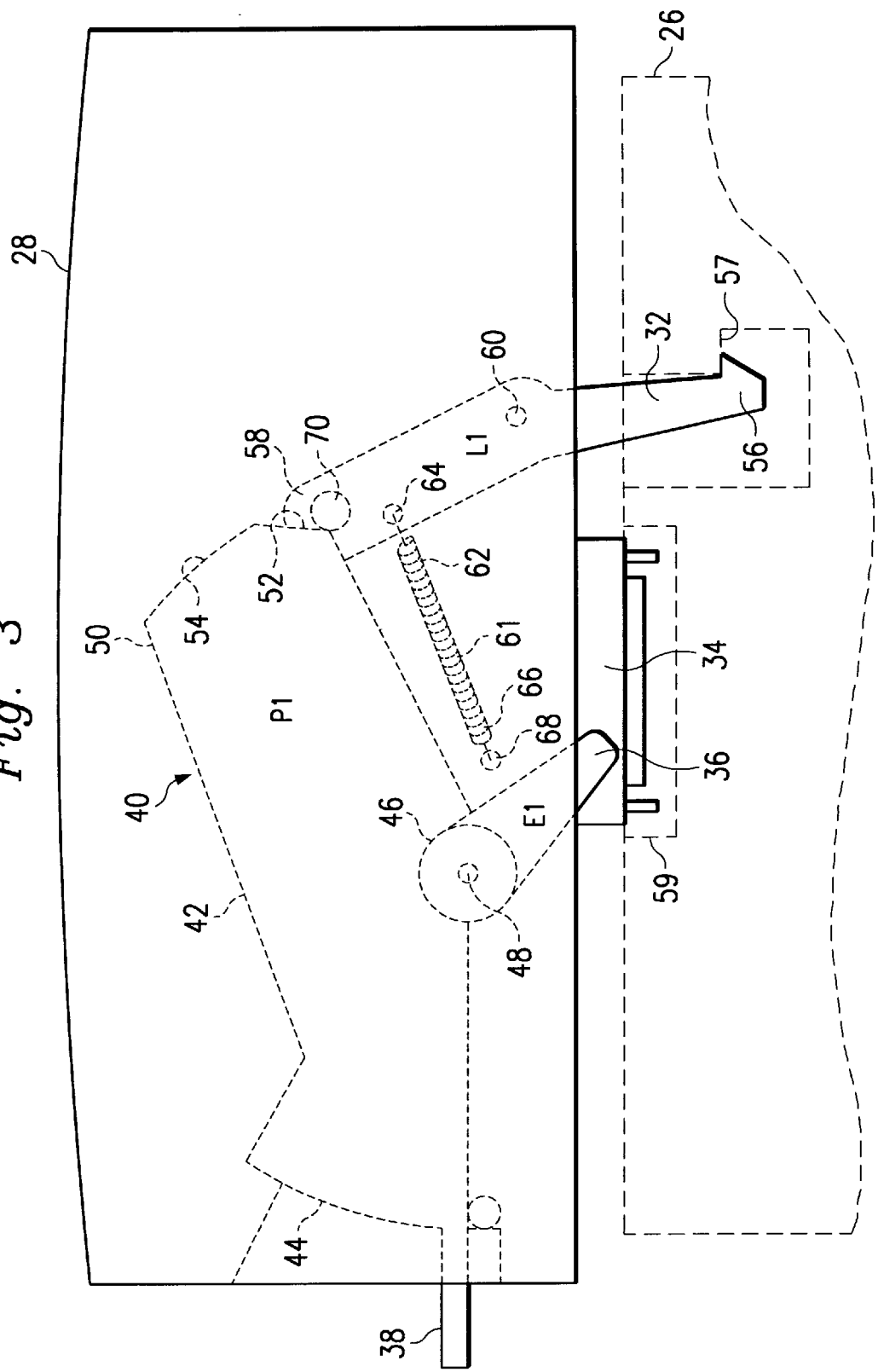
FIG. 3 is a top plan view partially illustrating a docking station including an eject mechanism in a first position.

A computer release and eject arm 40, FIG. 3 is movably mounted in docking device 28. Arm 40 generally comprises an elongated body 42 including the handle 38 formed on a first end 44 thereof. A pivot mount 46 is formed on body 42 and is pivotably attached within docking device 28 by means of a pivot pin 48. The eject finger 36 extends from the body 42 adjacent to and radially outwardly from the pivot mount 46. A second end 50 of body 42, opposite first end 44, includes a first cam surface 52 spaced apart from the pivot mount 46. A second cam surface 54 is formed contiguous with first cam surface 52 and extends angularly with respect thereto.

The latch 32 includes a hook end 56, a cam end 58 and is pivotably mounted in docking device 28 by means of a pivot pin 60 positioned between hook end 56 and cam end 58. A resilient member such as a tension spring 61 is connected at a first end 62 to a connection 64 adjacent cam end 58 of latch 32. Tension spring 61 is also connected at a second end 66 to a fixed member 68 mounted in docking device 28. An annular cam member 70 is mounted on latch 32 adjacent cam end 58.

Arm 40, which can also be referred to as a latch release and eject arm, is generally comprised of two portions. The first portion is a latch release portion which includes the first and second cam surfaces 52, 54, respectively. The second portion is the eject portion which includes eject finger 36. Arm 40 is illustrated in a first position P1 in FIG. 3, with eject finger 36 in a first position E1, and latch 32 in a first position L1. In this position, hook end 56 is engaged with a portion 57 of computer 26. A connector 59 of computer 26 is engaged with connector 34 of docking device 28.

Figure 4:
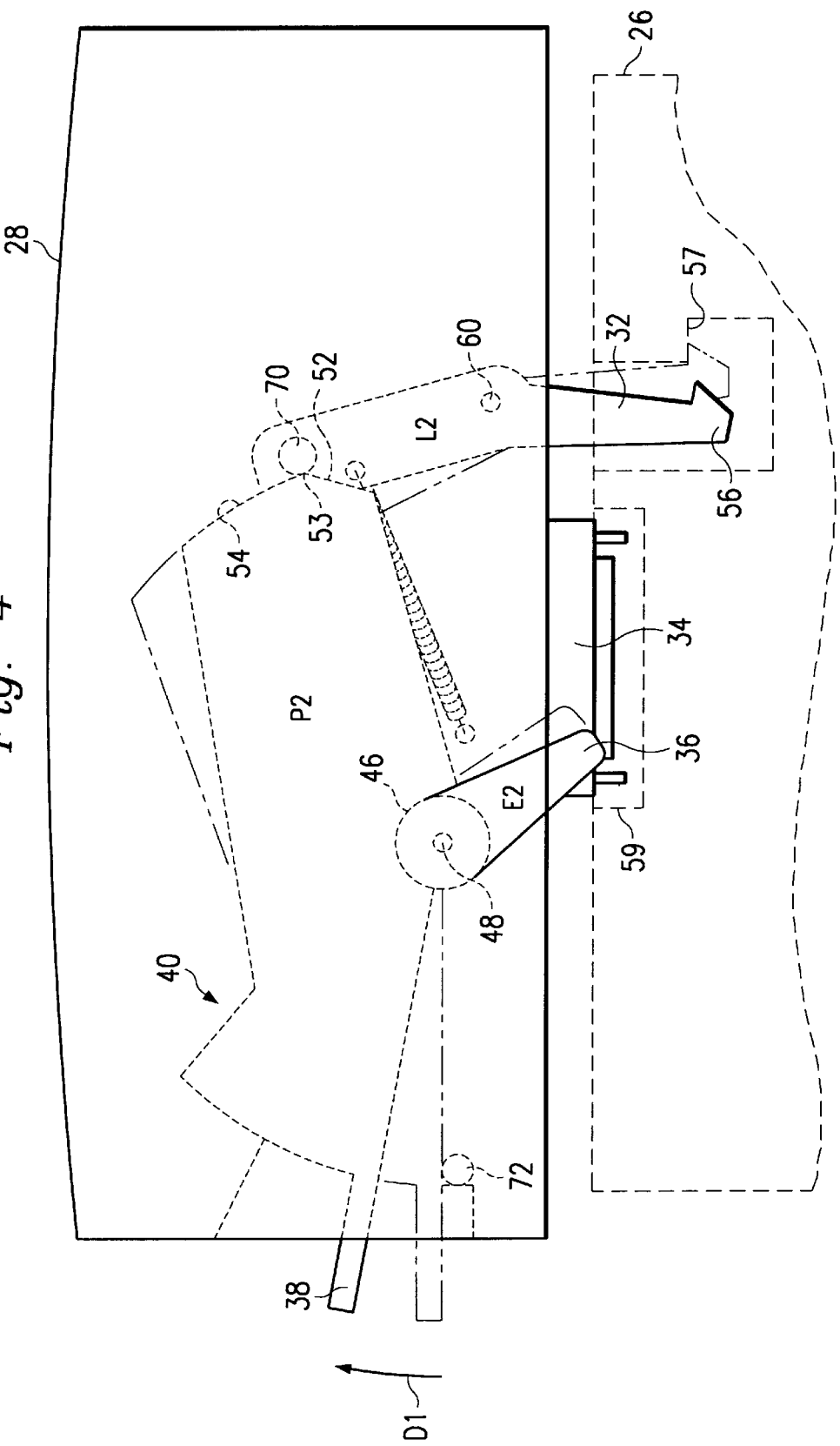
FIG. 4 is a top plan view partially illustrating an embodiment of the docking station including the eject mechanism in a second position.

In operation, referring to FIG. 4, handle 38 is moved in a direction designated D1 moving arm 40 to a second position P2 wherein handle 38 is moved away from a first stop member 72 mounted in docking device 28. As a result, first cam surface 52 is moved so that cam member 70 is displaced adjacent a point 53, between surface 52, 54, whereby latch 32 is moved to a second or unlatch position L2 sufficient for hook end 56 to disengage with portion 57 of computer 26. Although eject finger 36 is moved to a second position E2, the connector 59 of computer 26 remains engaged with the connector 34 of docking device 28.

Figure 5:
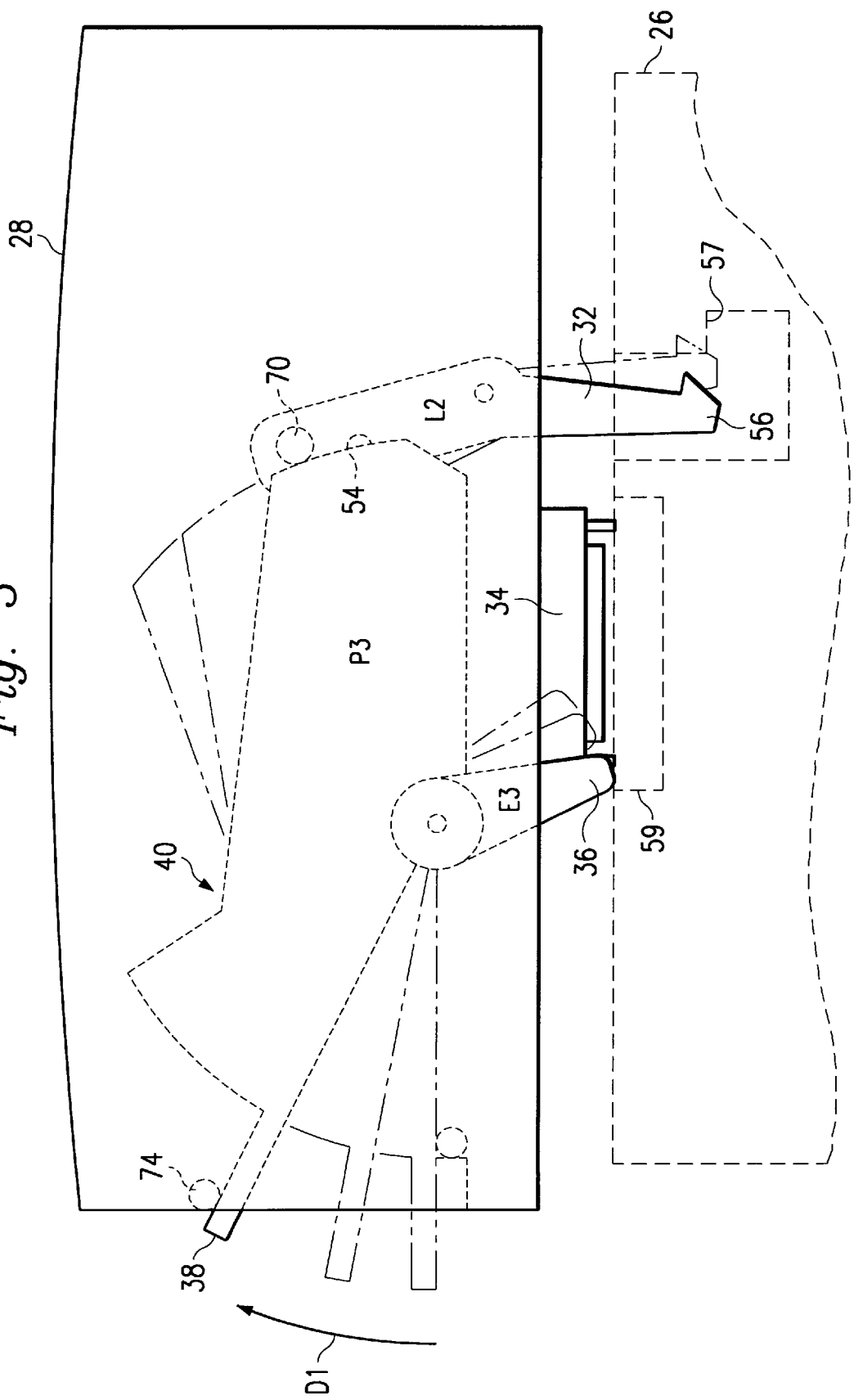
FIG. 5 is a top plan view partially illustrating an embodiment of the docking station including the eject mechanism in a third position.

Referring to FIG. 5, further movement of handle 38 in the direction designated D1 to engage a second stop member 74, moves arm 40 to a third position P3. As a result, second cam surface 54 supports and maintains cam member 70 stationary so that latch 32 remains in the second or unlatch position L2. Eject finger 36 is simultaneously moved to a third position E3 urging computer 26 away from docking device 28 thus disengaging and uncoupling the connectors 34 and 59 and moving hook end 56 out of engageable contact with portion 57. Thus computer 26 is separated from docking device 28 and may be removed therefrom without the need for the user to apply any force to separate connectors 34 and 59.

As it can be seen, the principal advantage of these embodiments is that a portable computer can be engaged by a movable latch which extends from a docking device to which the computer is coupled by engagement of a connector of the computer being engaged with a connector of the docking device. The latching serves as a security measure for the docked computer. The docked and latched computer can be both unlatched and separated from the docking device in a single, one-handed motion. During initial movement of the release and eject arm, the first cam surface functions to release the latch from the computer housing. During further movement of the release and eject arm, the second cam surface maintains the latch in a release position while the eject finger extends outwardly from the docking device to move the computer away from the docking device sufficiently to uncouple the computer connector and the docking device connector.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer system comprising:

a housing;

a microprocessor mounted in the housing;

an input device coupled to provide input to the microprocessor;

a mass storage coupled to the microprocessor;

a display coupled to the microprocessor by a video controller;

a memory device coupled to the microprocessor;

a docking tray supporting the housing;

a docking device mounted on the tray;

a pivotable latch extending from the docking device into the housing, the latch having a cam end in the docking device and a hook end opposite the cam end;

an arm pivotally mounted in the docking device;

a resilient member mounted in the docking device, the resilient member connected to the cam end of the latch for urging the latch into engagement with the arm;

the arm includig a handle formed on a first end of the arm;

a pivot mount formed between the first end of the arm and a second end of the arm;

an eject finger extending radially outwardly from the pivot mount;

a first cam surface formed on the second end of the arm opposite the first end for engagement with the cam end of the latch to move the hook end to an unlatch position; and a second cam surface contiguous with and extending angularly relative to the first cam for engagement with the cam end to maintain the hook end in the unlatch position while the eject finger is pivotally moved to extend from the docking device.

2. A device for docking a portable computer comprising:

a docking tray;

a docking device mounted on the tray;

a pivotable latch extending from the docking device, the latch having a cam end in the docking device and a hook end opposite the cam end;

an arm pivotally mounted in the docking device;

a resilient member mounted in the docking device, the resilient member connected to the cam end of the latch for urging the latch into engagement with the arm;

the arm including a handle formed on a first end of the arm;

a pivot mount formed between the first end of the arm and a second end of the arm;

an eject finger extending radially outwardly from the pivot mount;

a first cam surface formed on the second end of the arm opposite the first end for engagement with the cam end of the latch to move the hook end to an unlatch position; and a second cam surface contiguous with and extending angularly relative to the first cam surface for engagement with the cam end to maintain the hook end in the unlatch position while the eject finger is pivotally moved to extend from the docking device.

3. The device as defined in claim 1 wherein the eject finger is adjacent the pivot mount.

4. The device as defined in claim 1 wherein the eject finger extends radially outwardly from the pivot mount.

5. The device as defined in claim 1 wherein the docking device includes a connector adjacent the eject finger.

6. The device as defined in claim 1 wherein the docking device has a slot formed therein and the eject finger extends through the slot.

7. The device as defined in claim 5 wherein the docking device has a slot formed therein and the eject finger extends through the slot.

8. The device as defined in claim 1 wherein the arm simultaneously moves the latch and the eject finger.

* * * * *